(12) United States Patent
Micks et al.

(10) Patent No.: US 9,983,591 B2
(45) Date of Patent: May 29, 2018

(54) AUTONOMOUS DRIVING AT INTERSECTIONS BASED ON PERCEPTION DATA

(71) Applicant: Ford Global Technologies, LLC, Dearborn, MI (US)

(72) Inventors: Ashley Elizabeth Micks, Mountain View, CA (US); Harpreetsingh Banvait, Sunnyvale, CA (US); Jinesh J Jain, San Mateo, CA (US); Brielle Reiff, Cincinnati, OH (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 14/933,693

(22) Filed: Nov. 5, 2015

(65) Prior Publication Data

US 2017/0131719 A1 May 11, 2017

(51) Int. Cl.
*G05D 1/02* (2006.01)
*B60W 40/08* (2012.01)
*G08G 1/16* (2006.01)

(52) U.S. Cl.
CPC ............ *G05D 1/0246* (2013.01); *B60W 40/08* (2013.01); *G08G 1/161* (2013.01); *G08G 1/166* (2013.01);
(Continued)

(58) Field of Classification Search
CPC ................. G05D 1/024; G05D 1/0274; G05D 2201/0213; G06F 3/005; G06K 9/00798; G06K 9/00805; G08G 1/166; G08G 1/167; G08G 1/054; B60R 1/00; B60R 2300/302; B60R 2001/1223; B60R 2300/105; B60R 2300/106; B60R 2300/802; B60R 2300/8046; B60R 2300/8053; B60Q 9/008; B60W 30/12; B60W 2420/42; B60W 2550/302; B60W 2550/306; B60K 35/00;
(Continued)

(56) References Cited

U.S. PATENT DOCUMENTS 6,111,523 A * 8/2000 Mee ........................ G08G 1/054
340/936
6,373,402 B1 * 4/2002 Mee ........................ G08G 1/054
340/936
(Continued)

*Primary Examiner* — Kimberly Berona
*Assistant Examiner* — Sanjeev Malhotra
(74) *Attorney, Agent, or Firm* — David R. Stevens; Stevens Law Group

(57) ABSTRACT

Systems, methods, and devices for predicting a driver's intention and future movements of a proximal vehicle, whether an automated vehicle or a human driven vehicle, are disclosed herein. A system for predicting future movements of a vehicle includes an intersection component, a camera system, a boundary component, and a prediction component. The intersection component is configured to determine that a parent vehicle is near an intersection. The camera system is configured to capture an image of the proximal vehicle. The boundary component is configured to identify a sub-portion of the image containing a turn signal indicator on the proximal vehicle. The prediction component is configured to predict future movement of the proximal vehicle through the intersection based on a state of the turn signal indicator.

17 Claims, 6 Drawing Sheets

(52) U.S. Cl.
CPC ............ *G05D 1/024* (2013.01); *G05D 1/0257* (2013.01); *G05D 2201/0213* (2013.01)

(58) Field of Classification Search
CPC ..... B60K 37/02; G01S 13/931; G01S 17/936; G01C 21/3626; G01C 21/3647; G01C 21/3697; H04W 4/00
USPC ......... 701/36, 41, 117, 300, 301; 340/425.5, 340/436, 438, 691.6, 905, 936; 348/116, 348/148; 382/104; 345/76, 427; 359/603
See application file for complete search history.

(56) References Cited

U.S. PATENT DOCUMENTS

| | | | |
|---|---|---|---|
| 6,515,664 B1* | 2/2003 | Hii | G06T 3/0043 345/427 |
| 8,457,827 B1 | 6/2013 | Ferguson | |
| 8,788,134 B1 | 7/2014 | Litkouhi | |
| 8,914,225 B2 | 12/2014 | Caskey | |
| 8,949,016 B1* | 2/2015 | Ferguson | B60W 30/00 340/436 |
| 2002/0152010 A1* | 10/2002 | Colmenarez | B60R 25/2045 701/36 |
| 2005/0040940 A1* | 2/2005 | Sonobe | B60K 37/02 340/438 |
| 2005/0117364 A1* | 6/2005 | Rennick | B60R 1/1207 362/540 |
| 2005/0122235 A1* | 6/2005 | Teffer | G08G 1/01 340/937 |
| 2007/0088488 A1* | 4/2007 | Reeves | G07C 5/085 701/117 |
| 2007/0279241 A1* | 12/2007 | Jung | H04M 1/7253 340/691.6 |
| 2008/0117031 A1* | 5/2008 | Chiang | B60Q 9/008 340/425.5 |
| 2008/0136612 A1* | 6/2008 | MacHii | G01S 11/12 340/435 |
| 2010/0036578 A1 | 2/2010 | Taguchi | |
| 2010/0208068 A1* | 8/2010 | Elsemore | A01M 31/002 348/143 |
| 2010/0253541 A1* | 10/2010 | Seder | G01S 13/723 340/905 |
| 2011/0025584 A1* | 2/2011 | Nishigasako | G02B 27/01 345/76 |
| 2011/0050460 A1* | 3/2011 | Bruns | H04M 1/6075 340/905 |
| 2012/0287510 A1* | 11/2012 | Kuhlman | B60R 1/088 359/603 |
| 2013/0106591 A1* | 5/2013 | Kamijo | B60Q 1/00 340/425.5 |
| 2013/0182113 A1* | 7/2013 | Shih | H04N 7/181 348/148 |
| 2014/0063255 A1* | 3/2014 | Breed | B60R 21/0134 348/148 |
| 2014/0100770 A1* | 4/2014 | Chiang | B60Q 9/008 701/301 |
| 2014/0132753 A1* | 5/2014 | Watanabe | B60R 1/00 348/116 |
| 2014/0149031 A1* | 5/2014 | Goudy | G08G 1/161 701/300 |
| 2014/0195214 A1 | 7/2014 | Kozloski | |
| 2014/0358427 A1* | 12/2014 | Fuhrman | G01C 21/3602 701/452 |
| 2015/0166062 A1* | 6/2015 | Johnson | B60W 30/12 701/41 |
| 2015/0274074 A1* | 10/2015 | Petrillo | B60R 1/00 701/36 |
| 2016/0016585 A1* | 1/2016 | Park | B60W 30/12 701/41 |
| 2016/0075279 A1* | 3/2016 | Takamatsu | B60Q 9/00 701/36 |
| 2016/0107687 A1* | 4/2016 | Yamaoka | B62D 15/0255 701/41 |
| 2016/0137206 A1* | 5/2016 | Chandraker | G06T 17/00 382/104 |

\* cited by examiner

AUTONOMOUS DRIVING AT INTERSECTIONS BASED ON PERCEPTION DATA

TECHNICAL FIELD

The disclosure relates generally to methods, systems, and apparatuses for automated driving or for assisting a driver, and more particularly relates to methods, systems, and apparatuses for autonomous decision making at intersections using predictive modeling of the behavior of surrounding vehicles enabled by the perception of vehicle motion, turn signals, driver body language, and/or vehicle-to vehicle (V2V) or vehicle-to-infrastructure (V2X) information regarding past states of the vehicles.

BACKGROUND

Automobiles provide a significant portion of transportation for commercial, government, and private entities. Autonomous vehicles and driving assistance systems are currently being developed and deployed to provide safety, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive and navigate a vehicle with little or no user input. However, due to the dangers involved in driving and the costs of vehicles, it is extremely important that autonomous vehicles and driving assistance systems operate safely and are able to accurately navigate roads and avoid other vehicles even in situations where both autonomous vehicles and human-driven vehicles are present.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
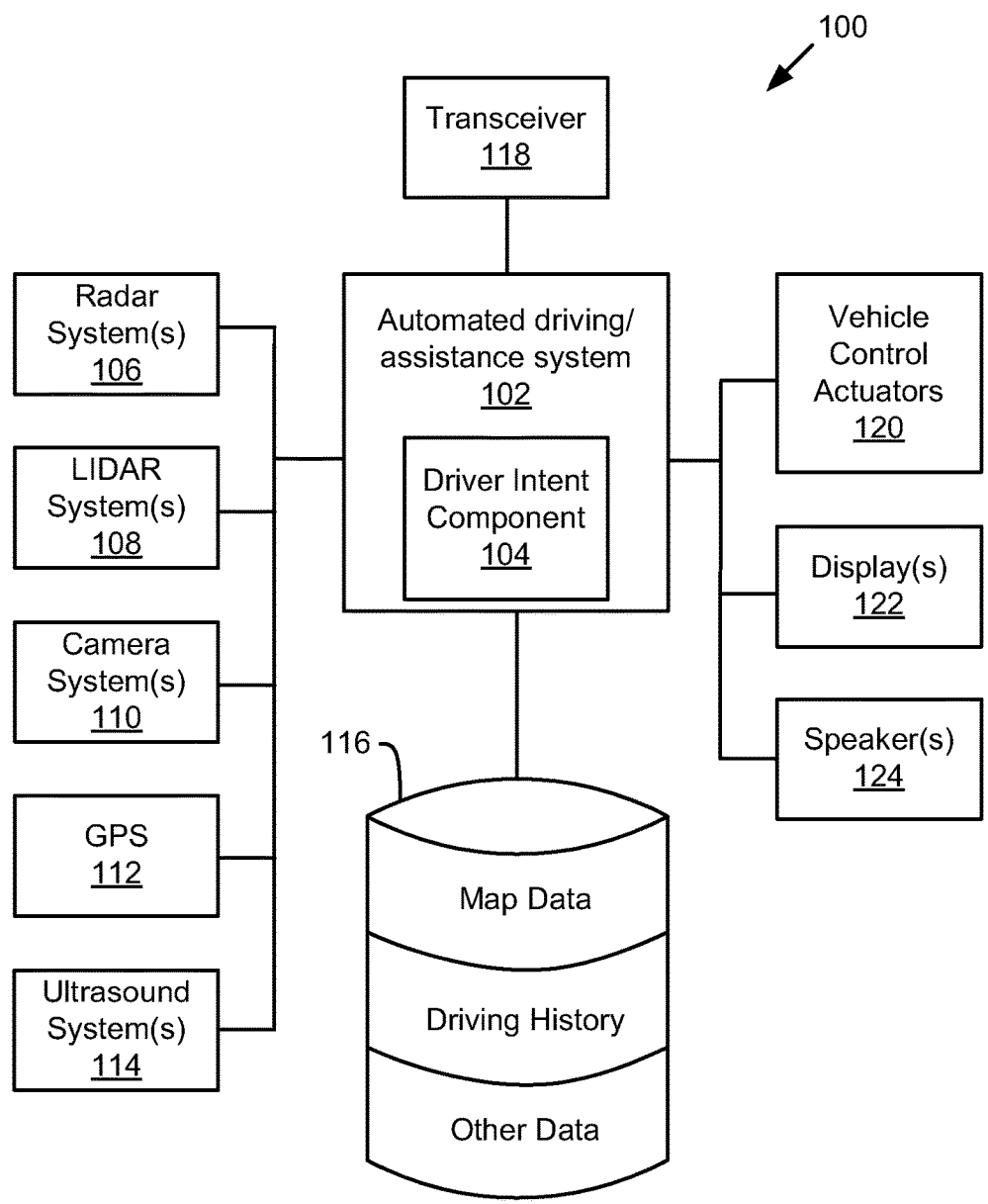
FIG. 1 is a schematic block diagram illustrating an implementation of a vehicle control system that includes an automated driving/assistance system.

Applicants have recognized that the first generations of autonomous vehicles must drive safely alongside human drivers. Specifically, intersections, including four-way stops, are one of the more challenging scenarios for an autonomous vehicle to handle because decisions about when to proceed into the intersection must be made on a case-by-case basis in the presence of human driver's whose behavior is not standardized.

Thus, it is desirable for these autonomous vehicles to be able to predict the motion of surrounding vehicles, even if they are human-driven. Applicants have recognized that autonomous vehicles can more accurately predict what a human driver will do, or intends to do, based on the motion of other vehicles, the body language of the drivers, vehicle turn signals (or lack thereof), and wireless communications, such as vehicle-to vehicle (V2V) or vehicle-to-infrastructure (V2X). For example, an autonomous vehicle may interpret body language of a human driver, or the other above information about a different vehicle than the autonomous vehicle. Thus, the autonomous vehicle does not depend on the other vehicle, or a driver of the other vehicle, to provide specific information about what the human driver is intending to do. Furthermore, the autonomous vehicle may be able to accommodate actions by a human driver that may be unpredictable compared to more standardized behavior in an autonomous driving system.

This disclosure presents systems, methods, and apparatuses for autonomous driving systems or driving assistance systems to use information from V2V or V2X, including information on past states of other vehicles not knowable via perception alone, with information from perception systems about the body language of drivers in other vehicles, and the other vehicles' motion and turn signals. These various types of information may be fused to form predictions about the motion of other vehicles at intersections. These predictions may then aid in the process of autonomously deciding whether to wait or to proceed into the intersection. In one embodiment, neural networks or other models may be trained to correlate the vehicles' past motion, driver body language, current vehicle motion, and/or turn signal information to one or more expected subsequent motions of these surrounding vehicles. Perception may be done with cameras, light ranging and detection (LIDAR), radar, ultrasound, or other range sensors to help determine areas of interest within a given camera image.

In one embodiment, perception algorithms along with past vehicle states via V2V or V2X communication provide locations of other vehicles and use that information to track the vehicles. In one embodiment, systems may identify regions of interest to extract information related to driver intent such as head orientation, gaze direction, turn signals, and vehicle motion. According to one embodiment, an autonomous vehicle may locate vehicles within a current 360 degree frame of all data sensors. The autonomous vehicle may determine boundary boxes around areas of the image where the drivers of those vehicles would be found and provide the image data and range sensor data within the boundary boxes to algorithms that will estimate driver head orientation and gaze direction and also recognize driver gestures. This information may be interpreted to determine a driver's intent in terms of predicted subsequent vehicle motion of the other vehicles. These predictions may be taken into account to decide when to enter the intersection.

In one embodiment, prediction algorithms for predicting what a human driver will do based on body language or other information may be hard-coded or may be learned and modified using artificial intelligence. For example, gestures or body language of a human driver may be monitored or learned during a driving event and then the gestures or body language may be associated with a resulting vehicle movement or timing of vehicle movement.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "autonomous vehicle" may be a vehicle that acts or operates completely independent of a human driver; or may be a vehicle that acts or operates independent of a human driver in some instances while in other instances a human driver may be able to operate the vehicle; or may be a vehicle that is predominantly operated by a human driver, but with the assistance of an automated driving/assistance system.

Implementations of the systems, devices, and methods disclosed herein may comprise or utilize a special purpose or general-purpose computer including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

Referring now to the figures, FIG. 1 illustrates a vehicle control system 100 that includes an automated driving/assistance system 102. The automated driving/assistance system 102 may be used to automate or control operation of a vehicle, such as a car, truck, van, bus, large truck, emergency vehicles or any other automobile for transporting people or goods, or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 includes a driver intent component 104, which may predict a future movement of a different vehicle based on one or more of V2V or V2X communications, turn signal indicators, driver body language, and vehicle movement. For example, the driver intent component 104 may estimate an intention of the driver of a different vehicle (e.g., a vehicle that does not include the vehicle control system 100) based on a turn signal state, a driver gesture, a driver gaze direction, and/or a driver head orientation.

The vehicle control system 100 also includes one or more sensor systems/devices for detecting a presence of nearby objects or determining a location of a parent vehicle (e.g., a vehicle that includes the vehicle control system 100) or nearby objects. For example, the vehicle control system 100 may include one or more radar systems 106, one or more LIDAR systems 108, one or more camera systems 110, a global positioning system (GPS) 112, and/or one or more ultrasound systems 114. The vehicle control system 100 may include a data store 116 for storing relevant or useful data for navigation and safety such as map data, driving history or other data. The vehicle control system 100 may also include a transceiver 118 for wireless communication with a mobile or wireless network, other vehicles, infrastructure, or any other communication system. The vehicle control system 100 may include vehicle control actuators 120 to control various aspects of the driving of the vehicle such as electric motors, switches or other actuators, to control braking, acceleration, steering or the like. The vehicle control system 100 may also include one or more displays 122, speakers 124, or other devices so that notifications to a human driver or passenger may be provided. The display 122 may include a heads-up display, a dashboard display or indicator, a display screen, or any other visual indicator, which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation. For example, the driver intent component 104 may be separate from the automated driving/assistance system 102 and the data store 116 may be included as part of the automated driving/assistance system 102 and/or part of the driver intent component 104.

The radar system 106 may include any radar system known in the art. In general, a radar system 106 operates by transmitting radio signals and detecting reflections off objects. In ground applications, the radar may be used to detect physical objects, such as other vehicles, parking barriers or parking chocks, landscapes (such as trees, cliffs, rocks, hills, or the like), road edges, signs, buildings, or other objects. The radar system 106 may use the reflected radio waves to determine a size, shape, distance, surface texture, or other information about a physical object or material. For example, the radar system 106 may sweep an area to obtain data about objects within a specific range and viewing angle of the radar system 106. In one embodiment, the radar system 106 is configured to generate perception information from a region near the vehicle, such as one or more regions nearby or surrounding the vehicle. For example, the radar system 106 may obtain data about regions of the ground or vertical area immediately neighboring or near the vehicle. The radar system 106 may include one of many widely available commercially available radar systems. In one embodiment, the radar system 106 may provide perception data including a two dimensional or three-dimensional map or model to the automated driving/assistance system 102 for reference or processing.

The LIDAR system 108 may include any LIDAR system in the art. In general, the LIDAR system 108 operates by emitting visible wavelength or infrared wavelength lasers and detecting reflections of the laser light off objects. In ground applications, the lasers may be used to detect physical objects, such as other vehicles, parking barriers or parking chocks, landscapes (such as trees, cliffs, rocks, hills, or the like), road edges, signs, buildings, or other objects. The LIDAR system 108 may use the reflected laser light to determine a size, shape, distance, surface texture, or other information about a physical object or material. For example, the LIDAR system 108 may sweep an area to obtain data or objects within a specific range and viewing angle of the LIDAR system 108. For example, the LIDAR system 108 may obtain data about regions of the ground or vertical area immediately neighboring or near the vehicle. The LIDAR system 108 may include one of many widely available commercially available LIDAR systems. In one embodiment, the LIDAR system 108 may provide perception data including a two dimensional or three-dimensional model or map of detected objects or surfaces.

The camera system 110 may include one or more cameras, such as visible wavelength cameras or infrared cameras. The camera system 110 may provide a video feed or periodic images, which can be processed for object detection, road identification and positioning, or other detection or positioning. In one embodiment, the camera system 110 may include two or more cameras, which may be used to provide ranging (e.g., detecting a distance) for objects within view. In one embodiment, image processing may be used on captured camera images or video to detect vehicles, turn signals, drivers, gestures, and/or body language of a driver. In one embodiment, the camera system 110 may include cameras that obtain images for two or more directions around the vehicle.

The GPS system 112 is one embodiment of a positioning system that may provide a geographical location of the vehicle based on satellite or radio tower signals. GPS systems 112 are well known and widely available in the art. Although GPS systems 112 can provide very accurate positioning information, GPS systems 112 generally provide little or no information about distances between the vehicle and other objects. Rather, they simply provide a location, which can then be compared with other data, such as maps, to determine distances to other objects, roads, or locations of interest.

The ultrasound system 114 may be used to detect objects or distances between a vehicle and objects using ultrasonic waves. For example, the ultrasound system 114 may emit ultrasonic waves from a location on or near a bumper or side panel location of a vehicle. The ultrasonic waves, which can travel short distances through air, may reflect off other objects and be detected by the ultrasound system 114. Based on an amount of time between emission and reception of reflected ultrasonic waves, the ultrasound system 114 may be able to detect accurate distances between a bumper or side panel and any other objects. Due to its shorter range, ultrasound systems 114 may be more useful to detect objects during parking or to detect imminent collisions during driving.

In one embodiment, the radar system(s) 106, the LIDAR system(s) 108, the camera system(s) 110, and the ultrasound system(s) 114 may detect environmental attributers or obstacles near a vehicle. For example, the systems 106-110 and 114 may detect other vehicles, pedestrians, people, animals, a number of lanes, lane width, shoulder width, road surface curvature, road direction curvature, rumble strips, lane markings, presence of intersections, road signs, bridges, overpasses, barriers, medians, curbs, or any other details about a road. As a further example, the systems 106-110 and 114 may detect environmental attributes that include information about structures, objects, or surfaces near the road, such as the presence of drive ways, parking lots, parking lot exits/entrances, sidewalks, walkways, trees, fences, buildings, parked vehicles (on or near the road), gates, signs, parking strips, or any other structures or objects.

The data store 116 stores map data, driving history, and other data, which may include other navigational data, settings, or operating instructions for the automated driving/assistance system 102. The map data may include location data, such as GPS location data, for roads, parking lots, parking stalls, or other places where a vehicle may be driven or parked. For example, the location data for roads may include location data for specific lanes, such as lane direction, merging lanes, highway or freeway lanes, exit lanes, or any other lane or division of a road. The location data may also include locations for one or more parking stall in a parking lot or for parking stalls along a road. In one embodiment, the map data includes location data about one or more structures or objects on or near the roads or parking locations. For example, the map data may include data regarding GPS sign location, bridge location, building or other structure location, or the like. In one embodiment, the map data may include precise location data with accuracy within a few meters or within sub meter accuracy. The map data may also include location data for paths, dirt roads, or other roads or paths, which may be driven by a land vehicle.

The driving history (or drive history) may include location data for past trips or parking locations of the vehicle. For example, the driving history may include GPS location data for the previous trips or paths taken. As an example, the driving history may include distance or relative location data with respect to lane lines, signs, road border lines, or other objects or features on or near the roads. The distance or relative location data may be determined based on GPS data, radar data, LIDAR data, camera data, or other sensor data gathered during the previous or past trips taken by the vehicle. In one embodiment, the automated driving/assistance system 102 is configured to log driving data to the data store 116 for and during any trips or drives taken by the vehicle.

The transceiver 118 is configured to receive signals from one or more other data or signal sources. The transceiver 118 may include one or more radios configured to communicate according to a variety of communication standards and/or using a variety of different frequencies. For example, the transceiver 118 may receive signals from other vehicles. Receiving signals from another vehicle is referenced herein as vehicle-to-vehicle (V2V) communication. In one embodiment, the transceiver 118 may also be used to transmit information to other vehicles to potentially assist them in locating vehicles or objects. During V2V communication the transceiver 118 may receive information from other vehicles about their locations, previous locations or states, other traffic, accidents, road conditions, the locations of parking barriers or parking chocks, or any other details that may assist the vehicle and/or automated driving/assistance system 102 in driving accurately or safely. For example, the transceiver 118 may receive updated models or algorithms for use by a driver intent component 104 in detecting vehicle movement, turn signals, or body language of a driver of another vehicle.

The transceiver 118 may receive signals from other signal sources that are at fixed locations. Infrastructure transceivers may be located at a specific geographic location and may transmit its specific geographic location with a time stamp. Thus, the automated driving/assistance system 102 may be able to determine a distance from the infrastructure transceivers based on the time stamp and then determine its location based on the location of the infrastructure transceivers. In one embodiment, receiving or sending location data from devices or towers at fixed locations is referenced herein as vehicle-to-infrastructure (V2X) communication. V2X communication may also be used to provide information about locations of other vehicles, their previous states, or the like. For example, V2X communications may include information about how long a vehicle has been stopped or waiting at an intersection. In one embodiment, the term V2X communication may also encompass V2V communication.

In one embodiment, the transceiver 118 may send and receive location data via a mobile network or cell connection. For example, the transceiver 118 may receive updated location data for a specific area as a vehicle travels along a roadway. Similarly, the transceiver 118 may receive historical driving data for a parent vehicle or other vehicles that have driven along a road or parked in a parking lot at that location or at that stall. For example, the transceiver 118 may receive data that indicates locations of signs, parking barriers or parking chocks, or other objects, which may be detectable using a radar system 106, LIDAR system 108, camera system 110, GPS system 112, or ultrasound system 114. If the transceiver 118 is able to receive signals from three or more infrastructure transceivers, the automated driving/assistance system 102 may be able to triangulate its geographic location.

In one embodiment, the transceiver 118 may send and receive data regarding body language of drivers. For example, one or more gestures or gaze directions detected during an event, and a resulting action by a driver, may be uploaded to a server for processing as part of machine learning for driver intent estimation.

In one embodiment, the automated driving/assistance system 102 is configured to control driving or navigation of a parent vehicle. For example, the automated driving/assistance system 102 may control the vehicle control actuators 120 to drive a path on a road, parking lot, through an intersection, driveway or other location. For example, the automated driving/assistance system 102 may determine a path and speed to drive based on information or perception data provided by any of the components 106-118. As another example, the automated driving/assistance system 102 may determine when to wait or proceed at an intersection, when to change lanes, when to leave space for another vehicle to change lanes, or the like.

In one embodiment, the driver intent component 104 is configured to determine an intent of a driver of a nearby vehicle and/or predict a future movement, and timing for the movement, of a vehicle under control of a human driver.

Figure 2:
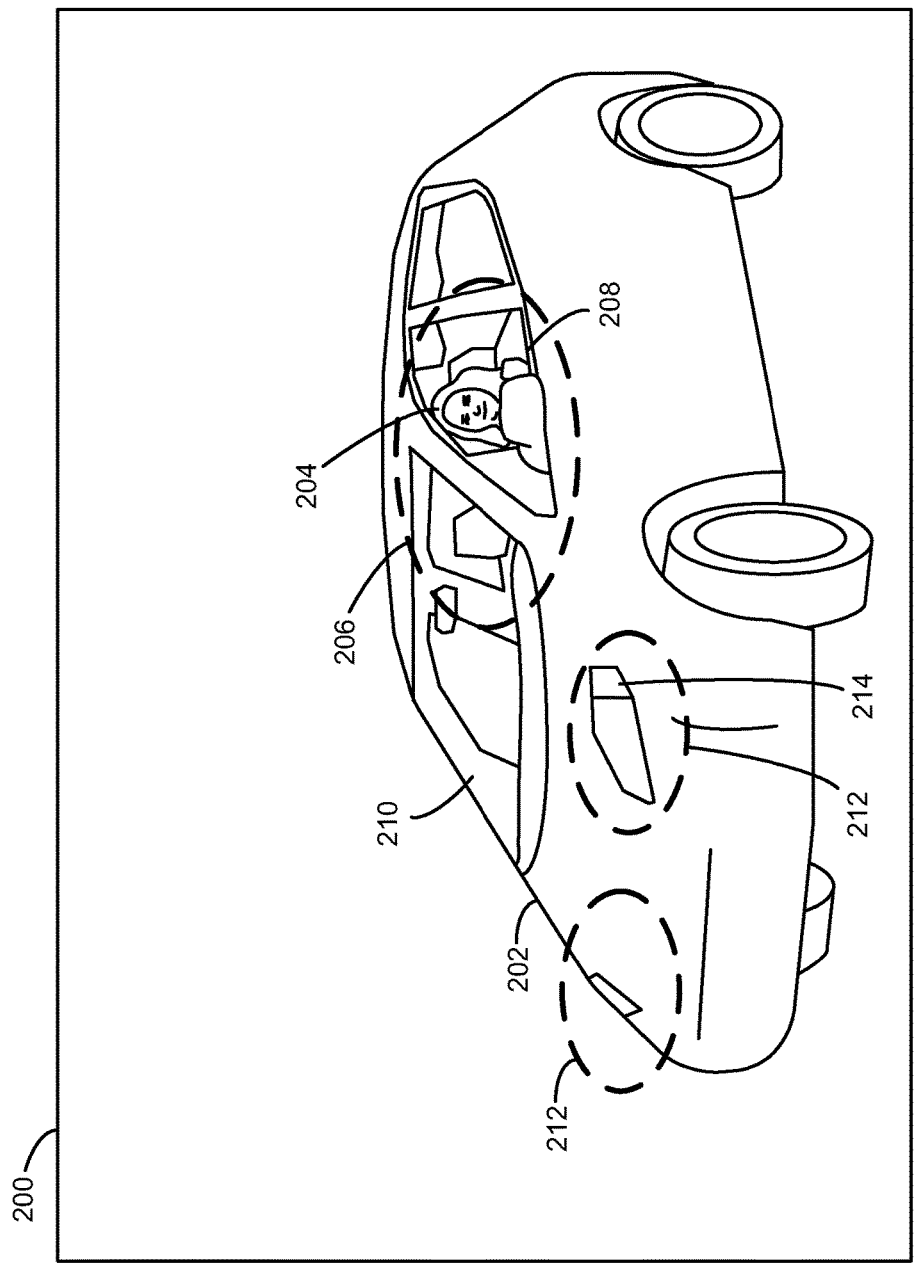
FIG. 2 illustrates a perspective view of a vehicle.

FIG. 2 illustrates an image 200 captured by a camera or other sensor of a vehicle or an autonomous vehicle. The image 200 includes a perspective view of a vehicle 202 with a human driver 204. For example, the view of the vehicle 202 may be captured by a camera at or near an intersection. The driver intent component 104 may identify the vehicle 202 as a vehicle within the captured image 200. The driver intent component 104 may determine a sub-region 206 of the image 200 that corresponds to a location or likely location of a driver 204. For example, the driver intent component 104 may identify a portion of the vehicle 202 where a driver 204 would usually sit, such as where a driver's seat would be located, etc.

In one embodiment, the driver intent component 104 may identify one or more windows of the vehicle 202, such as a driver's side window 208 and/or a windshield 210. In one embodiment, the driver intent component 104 may define the sub-region 206 of the vehicle 202 based on the location of the likely location of a driver 204, one or more windows 208, 210 of the vehicle 202, or by detecting a face of the driver 204. A sub-region 206 encompassing where the driver 204 may be located or reasonably expected to be located may be large enough to account for movements of the driver 204 (e.g., movements of the arms and/or head of the driver 204). By selecting or defining the sub-region 206, the driver intent component 104 may reduce computing power because a smaller area or fewer pixels than the whole image 200 may be analyzed to detect the driver 204, a gaze direction, a head orientation, and/or a gesture.

The driver intent component 104 may determine one or more sub-regions 212 of the image 200 that corresponds to a location or likely location of a turn signal indicator 214. The turn signal indicator 214 may include a left or right blinker light or other indicator that indicates a future turn, merge, or lane change. For example, a driver 204 may have controls to activate or deactivate one or more turn signals to indicate a direction the driver 204 intends to turn or drive the vehicle 202. In one embodiment, the driver intent component 104 may determine the one or more sub-regions 212 by identifying one or more of a headlight, tail light, bumper, or the like. For example, the driver intent component 104 may identify a region of the vehicle 202 that may likely include a light or turn signal indicator. As another example, the driver intent component 104 may perform edge detection and/or another algorithm to identify a blinker, headlight, tail light, or the like on the vehicle 202. The driver intent component 104 may define a boundary surrounding the turn signal indicator, which may be processed to detect a state of the turn signal indicator (e.g., whether the signal is blinking, turned off, or the like).

In one embodiment, the driver intent component 104 may determine one sub-region that includes a driver 204 and one or more turn signal indicators 214. For example, the driver intent component 104 may determine a single sub-region of the vehicle 202 that includes both the driver 204 and the turn signal indicator 214. In one embodiment, the driver intent component 104 may select a sub-region of the image 200 that contains all or most of the vehicle 202. For example, the sub-region including the vehicle 202 may be processed to both detect body language of the driver 204 and a state of the indicator 214.

Figure 3:
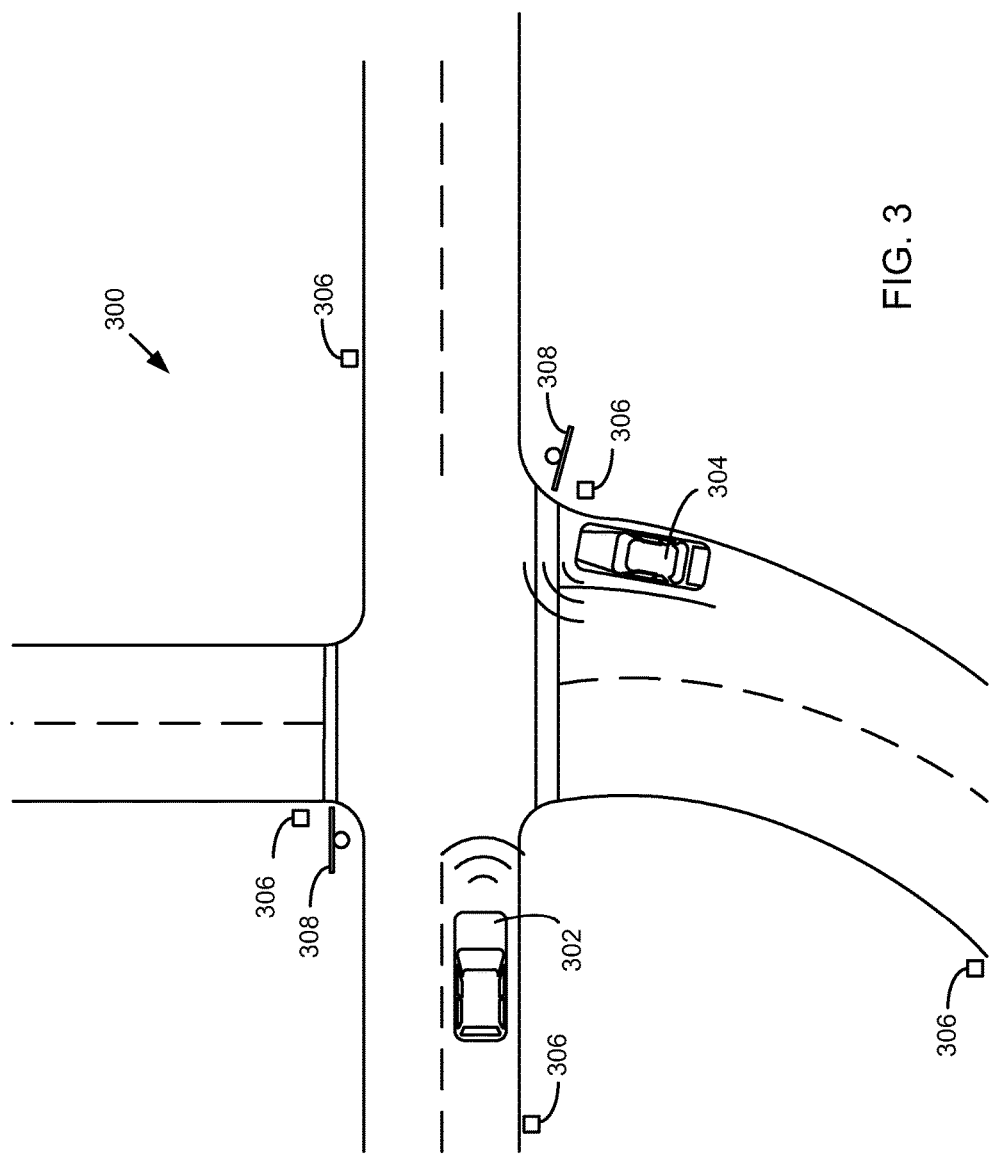
FIG. 3 is a schematic diagram illustrating a top view of an example road environment.

FIG. 3 is a schematic top view of a road 300 with a vehicle 302 traveling on the road. The vehicle 302 may include the system 100 of FIG. 1. In one embodiment, one or more sensors, such as the camera system 110, may gather perception data of the road 300 and regions around the vehicle 302. A viewing area of the camera system 110, the LIDAR system 108, the radar system 106 or other system may extend in any direction or all directions around the vehicle 302. The vehicle 302, or a driver intent component 104 of the vehicle 302, may receive perception data from the sensors and detect the presence of other vehicles, objects, surfaces, or the like within a viewing range of the vehicle 302. For example, the vehicle 302 may detect and identify vehicle 304 as a different vehicle.

In one embodiment, the vehicle 302 may identify a sub-portion of perception data that corresponds to a location where a driver will likely be located, such as a window of the vehicle or a region of the vehicle where a driver will likely be seated. The vehicle 302 may analyze the sub-portion of the perception data to infer an intent of the driver. For example, the vehicle 302, or a driver intent component 104 of the vehicle 302, may infer an intent of a driver to drive, stop, wait, or perform any other driving maneuver. In one embodiment, the vehicle 302 may identify a sub-portion of perception data that corresponds to a location where a turn signal is or is likely located, such as on or near a front or rear side of the vehicle 304, near a bumper, near headlights or tail lights, or the like. The vehicle 302 may analyze the sub-portion of the perception data to determine a state of the turn signal indicator. For example, the vehicle 302, or a driver intent component 104 of the vehicle 302, may determine that a blinker for the vehicle 304 is off or on and may determine a direction (e.g., left or right) that corresponds to the blinker. The vehicle 302 may infer an intention of the driver of the vehicle 304 based on the state of the turn signal indicator. Based on the inferred intent, the vehicle 302 may slow down speed up, and/or turn to avoid a potential collision.

In addition to perception data, the vehicle 302 may obtain information from a stored map, stored driving history, or from wireless signals. For example, an infrastructure transmitter 306 is shown near the road 300, which may provide specific positioning, environmental attribute details, or other information to the vehicle 302. As further examples, the vehicle 302 may receive information from other vehicles, such as vehicle 304, or from a wireless communication network, such as a mobile communication network. In one embodiment, the vehicle 302 may receive information about past states or locations of the vehicle 304. For example, the vehicle 302 may receive an indication of a time length that the vehicle 304 has been waiting at the intersection from the vehicle 304 or infrastructure transmitters 306.

Figure 4:
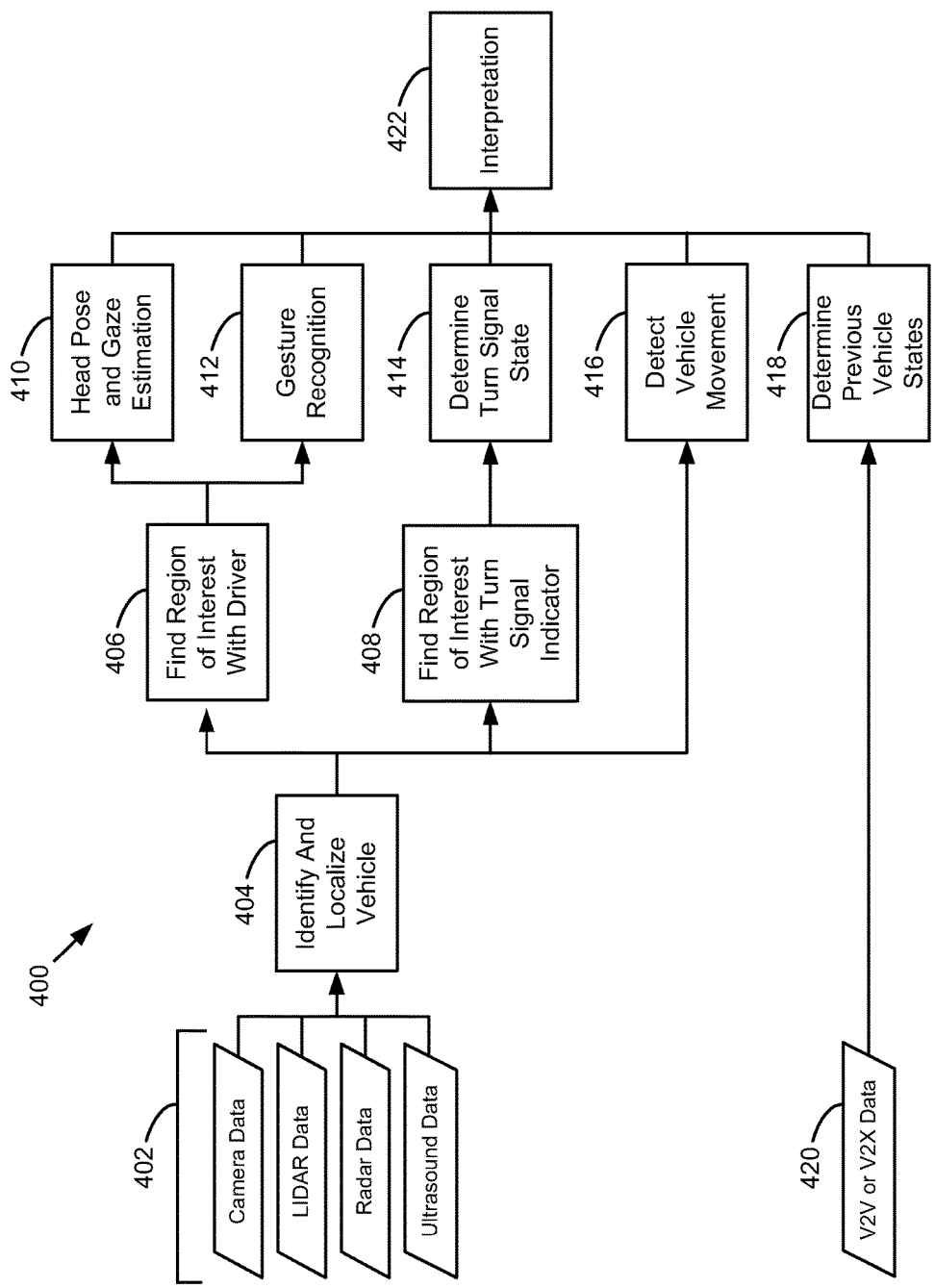
FIG. 4 is a schematic block diagram illustrating prediction of future vehicle movements, according to one implementation.

FIG. 4 is a schematic block diagram illustrating a method 400 for determining a driver's intent in another vehicle. Perception data, such as camera data, LIDAR data, radar data and ultrasound data, is obtained at 402 and a driver intent component 104 identifies and localizes a vehicle based on the perception data at 404. For example, the driver intent component 104 may identify a region of a viewing area or a region of an image that corresponds to a vehicle. The driver intent component 104 finds a region of interest at 406 that includes the driver of the vehicle. The region of interest may include a window, a region of the vehicle that corresponds to a driver's seat, or the like. The driver intent component 104 also finds a region of interest that includes a turn signal indicator, such as a region near a front or rear bumper, a headlight, and/or a tail light at 408. The driver intent component 104 estimates a head pose and a gaze direction at 410 and performs gesture recognition at 412. The driver intent component 104 also determines a turn signal state at 414. For example, the driver intent component 104 may determine whether a turn signal indicator is off or blinking at 414.

The driver intent component 104 detects one or more vehicle movements at 416. For example, an acceleration event, a deceleration event, a stop event, a turn event, or any other movement of the vehicle may be detected at 416. The driver intent component 104 may also determine one or more previous vehicle states for a detected vehicle at 418 based on V2V or V2X data at 420. For example, the previous vehicle states may include a time length that the vehicle has been at a location, one or more previous locations, accelerations, decelerations, or the like. Based on a head pose, a gaze direction, a detected gesture, a turn signal state, a detected vehicle movement, and/or previous vehicle states, the driver intent component 104 interprets 422 a driver's intent and/or predicts future motion of the driver's vehicle.

Figure 5:
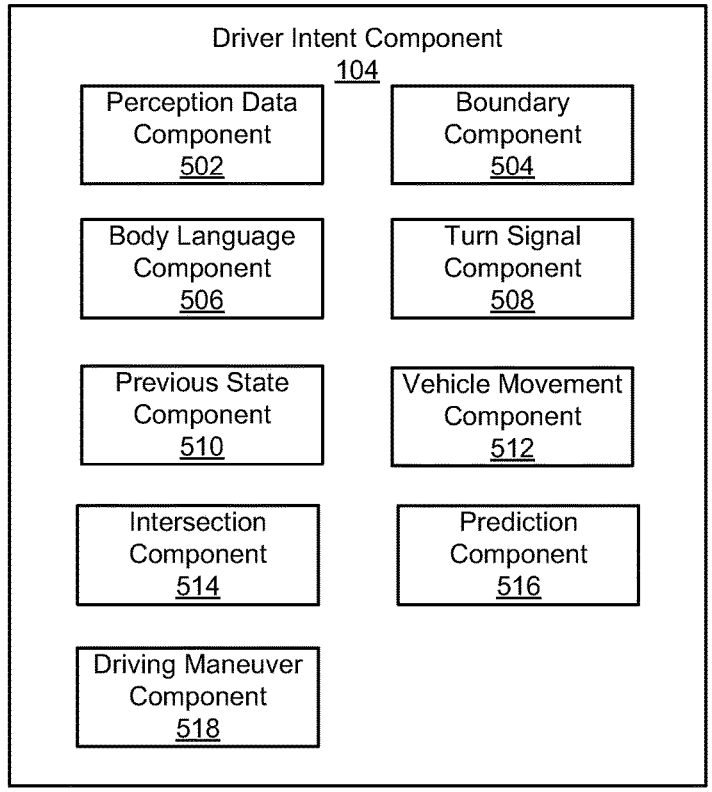
FIG. 5 is a schematic block diagram illustrating example components of a driver intent component, according to one implementation.

FIG. 5 is a schematic block diagram illustrating components of a driver intent component 104, according to one embodiment. The driver intent component 104 includes a perception data component 502, a boundary component 504, a body language component 506, a turn signal component 508, a previous state component 510, a vehicle movement component 512, an intersection component 514, a prediction component 516, and a driving maneuver component 518. The components 502-518 are given by way of illustration only and may not all be included in all embodiments. In fact, some embodiments may include only one or any combination of two or more of the components 502-518. Some of the components 502-518 may be located outside the driver intent component 104, such as within the automated driving/assistance system 102 or elsewhere.

The perception data component 502 is configured to receive sensor data from one or more sensor systems of the vehicle. For example, the perception data component 502 may receive data from the radar system 106, the LIDAR system 108, the camera system 110, the GPS 112, the ultrasound system 114, or the like. In one embodiment, the perception data may include perception data for one or more regions near the vehicle. For example, sensors of the vehicle may provide a 360 degree view around the vehicle. In one embodiment, the camera system 110 captures an image of a vehicle. For example, the vehicle may be proximal to a parent vehicle of the driver intent component 104. In one embodiment, the camera system 110 captures an image of a proximal vehicle near an intersection.

The boundary component 504 is configured to identify a sub-region of perception data that corresponds to a driver of a vehicle or a region near a driver of a vehicle. For example, the boundary component 504 may identify a sub-region of an image or other sensor data frame that will likely contain a driver of the vehicle, if present. The sub-region may be large enough to allow for movement of the driver, such as for gestures. In one embodiment, the sub-region may correspond to an area where body language algorithms may be applied without wasting processing power to detect gestures or drivers in areas where they are likely not located.

In one embodiment, the boundary component 504 is configured to locate one or more vehicles within images or other perception data. For example, object recognition algorithms may be used to identify detected objects or obstacles as vehicles. In one embodiment, the boundary component 504 may identify a boundary of the vehicle and identify pixels or objects in that region as corresponding to the vehicle. Edge or boundary finding image processing algorithms may be used to find the edges of the vehicle.

In one embodiment, the boundary component 504 may identify or define a sub-portion of the image or corresponding to an area where a driver of a vehicle is located or is likely located. In one embodiment, the boundary component 504 may look within a boundary of the vehicle to locate or define a boundary corresponding to a driver location. In one embodiment, the boundary component 504 is configured to identify the sub-portion of the image based on a location of one or more windows, a location of a driver's seat or steering wheel of a vehicle, and/or a location of a detected human in the vehicle. In one embodiment, the boundary component 504 may identify a boundary of one or more windows or may estimate a location of a driver's-side front seat of a vehicle. In one embodiment, the sub-region may correspond to or include the boundary of a window. For example, the sub-region may have a boundary following a boundary of one or more windows. In one embodiment, sub-region may have a boundary a little larger than a likely region where a driver is located to allow for movements or error in defining the boundary.

In one embodiment, the boundary component 504 is configured to identify a sub-portion of an image that contains a turn signal indicator of a vehicle. For example, the sub-portion of the image may include a turn signal indicator light positioned on a front, rear, or any other location of a vehicle. In one embodiment, the sub-portion may include a region on or near a bumper, and/or a region near a headlight or tail light of the vehicle. In one embodiment, the boundary component 504 may identify the sub-portion of the image that contains the turn signal using object recognition or edge detection image processing algorithms. For example, the boundary component 504 may identify an edge or boundary of an indicator light, headlight, tail light, or the like. In one embodiment, the boundary component 504 may determine a region surrounding the turn signal indicator or a region larger than the turn signal indicator so that states of the turn signal indicator may be accurately determined even if the boundary is not perfectly aligned or centered on the turn-signal indicator.

The body language component 506 is configured to detect a driver's body language. The body language component 506 may detect a driver's body language by identifying one or more of a driver's head orientation, a gaze direction, and a gesture. The head orientation may be an orientation of a person's head. For example, the head orientation may describe a direction that a driver's face is located. The head orientation may be described as one or more angles relative to a location of a parent vehicle of the driver intent component 104. For example, the angles may include an angle of the gaze direction with respect to a line drawn between a center of a vehicle (or other zero origin location used by an automated driving/assistance system 102) and the human driver. The gaze direction may include a direction in which a driver is looking. In some situations, the gaze direction may match a head orientation, but the gaze direction may also be different if the driver's eyes are not looking straight ahead. The gaze direction may be described as one or more angular offsets from the head orientation or may be described as angular directions independent of the head orientation.

Gestures may include any other type of body language including gestures, movements, or positions taking by the hands, arms, shoulders, neck, abdomen, face, head, or other parts of a body of the driver. Example gestures may include: waving gestures to wave another driver, a pedestrian, or cyclist to proceed at an intersection, road crossing, or lane merge; head movements indicating a no or yes; halt or stop hand signals where a hand is held up palm facing another vehicle or person with the fingers facing up; shrugs with shoulders; head movements from side to side to check for crossing vehicles; or any other gesture. Further gestures may be identified including gestures detected via machine learning or analysis of sensor data. In one embodiment, the body language component 506 may detect one or more of these gestures, or other gestures, performed by a driver of a nearby vehicle.

In one embodiment, the body language component 506 may save processing power by, at least initially, only attempting to detect body language within a boundary of an image or other perception data frame determined by the boundary component 504. For example only pixels, or the like, within the boundary may be processed by body language detection algorithms. Because gesture recognition, or recognition of other body language, can be computationally intensive, this can lead to significant time, processing, and energy savings for the driver intent component 104 or automated driving/assistance system 102.

The turn signal component 508 is configured to determine a state of a turn signal of a proximal vehicle. For example, the turn signal component 508 may determine a state of one or more turn signals of a vehicle that is located at an intersection near a parent vehicle. In one embodiment, the turn signal component 508 may process one or more sub-regions determined by the boundary component 504 to determine the state of the turn signal indicator. For example, the turn signal component 508 may detect whether a turn signal indicator is emitting light or blinking based on one or more images of the turn signal indicator. In one embodiment, the turn signal component 508 may determine whether one or more of a left turn signal indicator and a right turn indicator are on or blinking. For example, the turn signal indicator 508 may determine whether only the left turn signal indicator is flashing, only the right turn signal indicator is flashing, both the left turn signal indicator and the right turn signal indicator are flashing, or neither the left turn signal indicator nor the right turn signal indicator are flashing.

The previous state component 510 is configured to determine one or more previous states of a vehicle, such as a proximal vehicle at an intersection. In one embodiment, the previous state component 510 may determine previous states that are not determined, or cannot be determined, based on perception data. For example, the previous state component 510 may determine the one or more previous states of a proximal vehicle based on wireless communications indicating the one or more previous states of the proximal vehicle. The wireless communications may include V2V or V2X communications. The wireless communications may indicate a previous location of the proximal vehicle, a previous velocity of the proximal vehicle, a duration of time during which the proximal vehicle has been located near the intersection, or any other information about the proximal vehicle's previous movements, locations, or states.

The vehicle movement component 512 is configured to detect one or more movements of a proximal vehicle. For example, the vehicle movement component 512 may detect the movements of the proximal vehicle based on perception data or other sensor data received by the perception data component 502. In one embodiment, the vehicle movement component 512 may determine one or more accelerations, decelerations, turns, or the like of a proximal vehicle. In one embodiment, the vehicle movement component 512 may detect specific movements of a proximal vehicle, such as an acceleration followed quickly by a deceleration. For example, an acceleration followed quickly by a deceleration may indicate that a human driver is about to move or that the human driver is hesitating to proceed through an intersection. In one embodiment, correlations between movements and future actions by a human-driven vehicle may be determined by the prediction component 516.

The body language component 506, turn signal component 508, and/or the vehicle movement component 512 may include models, neural networks, machine learned parameters, or the like to detect body language, turn signal states, and vehicle movements. For example, guided or unguided machine learning algorithms may process perception data from real-world or virtual environments to learn shapes, movements, or other image content that corresponds to body language, turn signal states, or vehicle movement. The results of these machine learning algorithms may be included in models or databases for use by respective components to detect the body language, turn signal states, or vehicle movement during driving of a vehicle.

The intersection component 514 is configured to determine that a parent vehicle is located near an intersection. For example, the intersection component 514 may process sensor data to locate cross roads, signs, road markers or painted lines, stopped vehicles, or other aspects that may correlate with an intersection. In one embodiment, the intersection component 514 may reference a map and GPS location to determine that the parent vehicle is at or is approaching an intersection. Because it may be difficult for an autonomous vehicle to make driving decisions at an intersection, the intersection component 514 may specifically identify that the vehicle should operate according to an intersection scenario. For example, specific driving rules may apply to intersections or other driving scenarios.

The prediction component 516 may infer a driver's intention or predict future motions of a nearby vehicle based on the body language component 506, turn signal component 508, previous state component 510, the vehicle movement component 512, and/or the intersection component 514. For example, the prediction component 516 may predict future motion, and/or a timing for the future motion, based on body language of a driver, a state of a turn signal indicator, previous states of a vehicle, and/or detected vehicle movements.

In one embodiment, the prediction component 516 determines the driver's intention or predicts future motions based on body language detected by the body language component 506. For example, the prediction component 516 may determine a timing and a movement that the driver intends to perform. Example movements may include a turn onto a different road, waiting at an intersection, merging with traffic, changing lanes, exiting a roadway, entering a roadway, parking a vehicle, exiting a parking spot, or the like.

In one embodiment, the prediction component 516 references or processes a database or model to determine a predicted movement or intended movement of another vehicle. For example, the prediction component 516 may include or access a database or model that correlates body language with one or more future vehicle movements. In one embodiment, the database or model may correlate one or more of a head orientation, a gaze direction, and a gesture with one or more vehicle movements that are likely to occur following the head orientation, gaze direction, and/or gesture.

In one embodiment, the database or model may correlate future vehicle movements with one or more of a waving motion of a hand, a hand gesture comprising a palm facing toward the vehicle with fingers upward, a gaze direction of the driver for a threshold period of time (such as when a driver is staring at another vehicle waiting for that vehicle to go or when a driver stares straight ahead to being or continue to drive forward, a series of head movements, and a series of quick changes in gaze direction (e.g., checking cross traffic)). In one embodiment, the database or model may include a correlation between a gaze direction and a future driving direction. For example, the model may indicate a correlation between a driver looking in a specific direction followed by a vehicle moving in that specific direction. In one embodiment, the database or model correlates looking over a shoulder with future vehicle movement comprising a lane change or a turn. In one embodiment, the database or model may include one or more machine learned rules or correlations. For example, the database or model may include correlations and probabilities based on actual sensor data, head orientation, gaze directions, and gestures learned by a machine.

In one embodiment, the database or model also correlates an intention of a driver or a future driving maneuver based on a current driving context. For example, the same gestures may mean different things based on whether the nearby vehicle or parent vehicle is stopped at an intersection, approaching an intersection, driving down a road with one or more nearby vehicles, merging onto a roadway, exiting a roadway, entering a parking lot or parking spot, exiting a parking lot or parking spot, or the like. Thus, gestures and current driving context may be used to accurately infer an intention of a driver or predict a future driving maneuver. The prediction component 516 may provide the predicted driving maneuvers or driver intent to the driving maneuver component 518 or the automated driving/assistance system 102 for decision making for maneuvers or actions to be taken by the automated driving/assistance system 102 or a parent vehicle.

In one embodiment, the prediction component 516 determines the driver's intention or predicts future motions of the vehicle based on a state of a turn signal indicator as determined by the turn signal component 508. For example, the prediction component 516 may predict a timing and direction of travel for the vehicle to move through the intersection. In one embodiment, the prediction component 516 references or processes the database or model to determine the predicted movement or intended movement of another vehicle. For example, the prediction component 516 may include or access a database or model that correlates turn signal statuses with one or more future vehicle movements. In one embodiment, the database or model may correlate a blinker direction with the vehicle turning in that direction through the intersection. In one embodiment, the database or model may correlate a flashing of hazard lights (e.g., both turn signal indicators blinking) with a vehicle moving quickly through the intersection in an unpredictable direction without waiting according to normal protocols. Thus, an earlier timing for the vehicle with flashing hazard lights to move through the intersection may be predicted.

In one embodiment, the prediction component 516 determines the driver's intention or predicts future motions of the vehicle based on one or more previous states of the proximal vehicle as determined by the previous state component 510. For example, the prediction component 516 may predict a timing and direction of travel for the vehicle to move through the intersection. In one embodiment, the prediction component 516 references or processes the database or model to determine the predicted movement or intended movement of another vehicle. For example, the prediction component 516 may include or access a database or model that correlates previous states of a vehicle with one or more future vehicle movements. In one embodiment, the database or model may correlate a longer waiting time of a vehicle at the intersection with a faster in time movement through the intersection. In one embodiment, a vehicle that has been located near the intersection beyond a threshold amount of time may be determined to be parked or not functioning correctly. Thus, the prediction component 516 may determine that the vehicle that has been waiting longer than the threshold time may wait for yet an even longer time before proceeding through the intersection. The prediction component 516 may also predict future movements of the proximal vehicle based on previous locations, accelerations, decelerations or the like.

In one embodiment, the prediction component 516 determines the driver's intention or predicts future motions based on detected movements of the vehicle as determined by the vehicle movement component 512. For example, the prediction component 516 may predict a timing and direction of travel for the vehicle to move through the intersection. In one embodiment, the prediction component 516 references or processes the database or model to determine the predicted movement or intended movement of another vehicle. For example, the prediction component 516 may include or access a database or model that correlates one or more detected movements with one or more future movements. For example, the database may include an acceleration, velocity, deceleration, or other movement information with a predicted further movement through an intersection.

In one embodiment, the prediction component 516 may determine a driver's intention or future movement of a vehicle based on a combination of data from the body language component 506, turn signal component 508, previous state component 510, vehicle movement component 512, and intersection component 514. For example, the model or database may include machine learning values or correlations based motion of one or more vehicles, driver body language, previous vehicle states, and turn signal information during previous intersection driving scenarios. Thus, the prediction component 516 may predict future movements based on a combination of one or more of body language, turn signal indicator status, previous states, vehicle movements, and location at an intersection.

The driving maneuver component 518 is configured to select a driving maneuver for a parent vehicle based on the predicted driver intent or future driving maneuver of another vehicle. For example, the driving maneuver component 518 may receive one or more predicted driving maneuvers for one or more nearby vehicles from the prediction component 516. The driving maneuver may determine a driving path to avoid collision with the other vehicles in case they perform the predicted driving maneuvers. For example, the driving maneuver component 518 may determine whether to decelerate, accelerate, and/or turn a steering wheel of the parent vehicle. In one embodiment, the driving maneuver component 518 may determine a timing for the driving maneuver. For example, the driving maneuver component 518 may determine that a parent vehicle should wait at an intersection for a period of time because another vehicle is likely to proceed through the intersection during that time period. As another example, the driving maneuver component 518 may determine a timing for the parent vehicle to proceed through the intersection based on the predicted future movement of the proximal vehicle.

Figure 6:
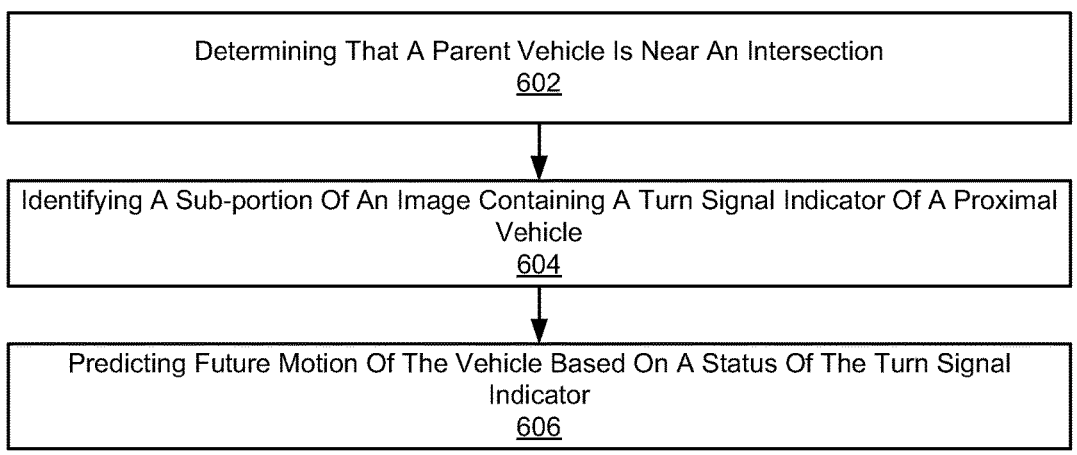
FIG. 6 is a schematic block diagram illustrating a method for predicting vehicle movements, according to one implementation.

Referring now to FIG. 6, a schematic flow chart diagram of a method 600 for predicting movement of a vehicle, according to one embodiment, is illustrated. The method 600 may be performed by an automated driving/assistance system or a driver intent component, such as the automated driving/assistance system 102 of FIG. 1 or the driver intent component 104 of FIG. 1 or 5.

The method 600 begins and an intersection component 514 determines that a parent vehicle is near an intersection at 602. A boundary component 504 identifies a sub-portion of the image that contains a turn signal indicator on the proximal vehicle at 604. A prediction component 516 predicts future movement of the proximal vehicle through the intersection based on a state of the turn signal indicator at 606.

Figure 7:
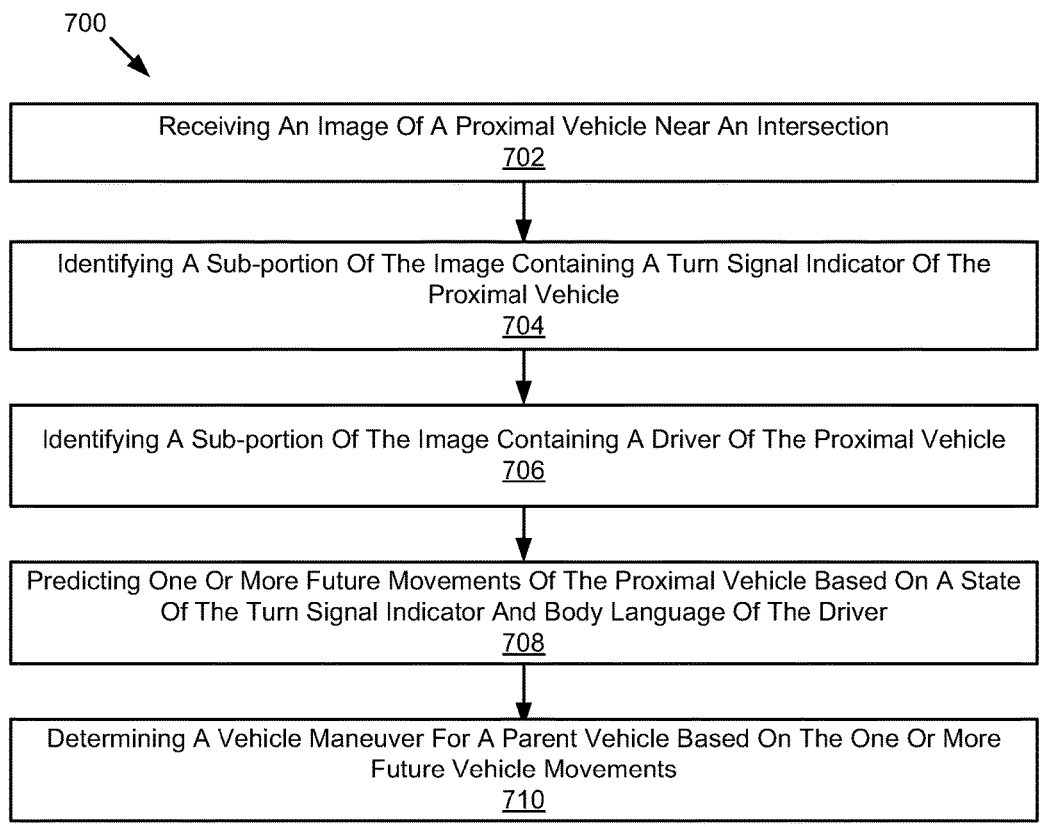
FIG. 7 is a schematic block diagram illustrating another method for predicting vehicle movements, according to one implementation.

Referring now to FIG. 7, a schematic flow chart diagram of a method 700 for predicting movement of a vehicle, according to one embodiment, is illustrated. The method 700 may be performed by an automated driving/assistance system or a driver intent component, such as the automated driving/assistance system 102 of FIG. 1 or the driver intent component 104 of FIG. 1 or 5.

The method 700 begins and a perception data component 502 receives an image of a proximal vehicle near an intersection at 702. For example, the proximal vehicle may be near a parent vehicle of a driver intent component 104. A boundary component 504 identifies a sub-portion of the image containing a turn signal indicator on the proximal vehicle at 704. The boundary component 504 identifies a sub-portion of the image containing a driver of the proximal vehicle at 706. A prediction component 516 predicts future movement of the proximal vehicle through the intersection based on a state of the turn signal indicator and body language of the driver at 708. A driving maneuver component 518 determines a time for the parent vehicle to proceed through the intersection based on the predicted future movement of the proximal vehicle at 710.

Examples

The following examples pertain to further embodiments.

Example 1 is a system that includes an intersection component, a camera system, a boundary component, and a prediction component. The intersection component is configured to determine that a parent vehicle is near an intersection. The camera system is configured to capture an image of a proximal vehicle. The boundary component is configured to identify a sub-portion of the image containing a turn signal indicator on the proximal vehicle. The prediction component is configured to predict future movement of the proximal vehicle through the intersection based on a state of the turn signal indicator.

In Example 2, the system of Example 1 further includes a turn signal component configured to process image data in the sub-portion of the image to determine the state of the turn signal indicator.

In Example 3, the system of any of Examples 1-2 further includes a previous state component configured to determine one or more previous states of the proximal vehicle based on wireless communications indicating the one or more previous states of the proximal vehicle. The prediction component is configured to predict future movements of the vehicle based on the one or more previous states of the proximal vehicle.

In Example 4, the wireless communication in Example 3 includes one or more of a V2V communication and a V2X communication.

In Example 5, the one or more previous states in any of Examples 3-4 indicate a duration of time during which the proximal vehicle has been located near the intersection.

In Example 6, the system of any of Examples 1-5 further include a vehicle movement component configured to determine one or more vehicle movements of the proximal vehicle. The prediction component is configured to predict future movements of the proximal vehicle based on the one or more vehicle movements of the proximal vehicle.

In Example 7, the boundary component in any of Examples 1-6 is further configured to identify a sub-portion of the image corresponding to a location of a driver. The system further includes a body language component configured to detect a driver's body language by identifying one or more of a driver's head orientation, a gaze direction, and a gesture. The prediction component is configured to predict future movements of the vehicle based on the driver's body language.

Example 8 is a computer implemented method. The method includes receiving an image of a proximal vehicle near an intersection and storing the image in computer memory. The method includes identifying, using one or more processors, a sub-portion of the image containing a turn signal indicator on the proximal vehicle and identifying, using the one or more processors, a sub-portion of the image containing a driver of the proximal vehicle. The method includes predicting, using the one or more processors, future movement of the proximal vehicle through the intersection based on a state of the turn signal indicator and body language of the driver. The method includes determining, using the one or more processors, a timing for the parent vehicle to proceed through the intersection based on the predicted future movement of the proximal vehicle. The method includes causing the parent vehicle to perform a driving maneuver based on the determined time to proceed through the intersection.

In Example 9, the method of Example 8 further includes determining that a parent vehicle is near an intersection.

In Example 10, the method of any of Examples 8-9 further includes processing image data in the sub-portion of the image containing a turn signal indicator to determine the state of the turn signal indicator and processing image data in the sub-portion of the image containing a driver of the proximal vehicle to determine the body language of the driver.

In Example 11, determining the body language of the driver in Example 10 includes identifying one or more of a driver's head orientation, a gaze direction, and a gesture.

In Example 12, the method of any of Examples 8-11 further includes determining one or more previous states of the proximal vehicle based on a wireless communication. Predicting future movements of the proximal vehicle includes predicting based on the one or more previous states of the proximal vehicle.

In Example 13, the wireless communication of Example 12 includes one or more of a V2V communication and a V2X communication.

In Example 14, the method of any of Examples 8-13 further includes detecting one or more vehicle movements of the proximal vehicle. Predicting future movements of the proximal vehicle includes predicting based on the one or more vehicle movements of the proximal vehicle.

In Example 15, the method of any of Examples 8-14 further includes accessing or processing a model or database correlating the state of the turn signal indicator and the body language of the driver with the predicted future movement.

In Example 16, the model or database of Example 15 includes machine learning values or correlations based on motion of one or more vehicles, driver body language, and turn signal information during previous intersection driving scenarios.

Example 17 is a computer readable storage media storing instructions that, when executed by one or more processors, cause the processors to determine that a parent vehicle is near an intersection. The instructions cause the processor to capture a plurality of images of a proximal vehicle. The instructions cause the processor to identify a sub-portion in each of the plurality of the images containing a turn signal indicator on the proximal vehicle. The instructions further cause the processor to predict future movement of the proximal vehicle through the intersection based on a state of the turn signal indicator.

In Example 18, the instructions of Example 17 further cause the processor to process image data in the sub-portion of the plurality of images to determine the state of the turn signal indicator.

In Example 19, the instructions of any of Examples 17-18 further cause the processor to: determine one or more previous states of the proximal vehicle based on wireless communications indicating the one or more previous states of the proximal vehicle; and predict future movements of the vehicle based on the one or more previous states of the proximal vehicle.

In Example 20, the instructions of any of Examples 17-19 further cause the processor to: identify a sub-portion of the image corresponding to a location of a driver; detect a driver's body language by identifying one or more of a driver's head orientation, a gaze direction, and a gesture; and predict future movements of the vehicle based on the driver's body language.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

Embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system comprising:
   an intersection component configured to determine that a parent vehicle is near an intersection;
   a camera system configured to capture an image of a proximal vehicle;
   a boundary component configured to identify a sub-portion of the image containing a turn signal indicator on the proximal vehicle and a driver of the proximal vehicle;
   a turn signal component configured to process image data in the sub-portion of the image to determine the state of the turn signal indicator;
   a prediction component configured to predict future movement of the proximal vehicle through the intersection based on a state of the turn signal indicator; and
   at least one or more processors configured to:
   process image data in the sub-portion of the image containing the driver of the proximal vehicle to determine a body language of the driver;
   predict future movement of the proximal vehicle through the intersection based on the state of the turn signal indicator and the body language of the driver;
   determine a time for the parent vehicle to proceed through the intersection based on a predicted future movement of the proximal vehicle; and
   wherein the at least one or more processors or an actuator causes the parent vehicle to perform a driving maneuver based on a determined time to proceed through the intersection.

2. The system of claim 1, further comprising a previous state component configured to determine one or more previous states of the proximal vehicle based on wireless communications indicating the one or more previous states of the proximal vehicle, wherein the prediction component is configured to predict future movements of the proximal vehicle based on the one or more previous states of the proximal vehicle.

3. The system of claim 2, wherein the wireless communication comprises one or more of a vehicle-to-vehicle (V2V) communication and a vehicle-to-infrastructure (V2X) communication.

4. The system of claim 2, wherein the one or more previous states indicate a duration of time during which the proximal vehicle has been located near the intersection.

5. The system of claim 1, further comprising a vehicle movement component configured to determine one or more vehicle movements of the proximal vehicle, wherein the prediction component is configured to predict future movements of the proximal vehicle based on the one or more vehicle movements of the proximal vehicle.

6. The system of claim 1, wherein the boundary component is further configured to identify a sub-portion of the image corresponding to a location of a driver, the system further comprising a body language component configured to detect a driver's body language by identifying one or more of a driver's head orientation, and a gaze direction, wherein the prediction component is configured to predict future movements of the proximal vehicle based on the driver's body language.

7. A computer implemented method comprising:
   receiving an image of a proximal vehicle near an intersection and storing the image in computer memory;
   identifying, using one or more processors, a sub-portion of the image containing a turn signal indicator on the proximal vehicle;
   identifying, using the one or more processors, a sub-portion of the image containing a driver of the proximal vehicle;

processing, using the one or more processors, image data in the sub-portion of the image containing a turn signal indicator to determine the state of the turn signal indicator;

processing, using the one or more processors, image data in the sub-portion of the image containing a driver of the proximal vehicle to determine a body language of the driver;

predicting, using the one or more processors, future movement of the proximal vehicle through the intersection based on the state of the turn signal indicator and the body language of the driver;

determining, using the one or more processors, a time for a parent vehicle to proceed through the intersection based on a predicted future movement of the proximal vehicle; and causing, using one or more processors or actuators, the parent vehicle to perform a driving maneuver based on a determined time to proceed through the intersection.

8. The method of claim 7, further comprising determining that the parent vehicle is near an intersection.

9. The method of claim 7, wherein determining the body language of the driver comprises identifying one or more of a driver's head orientation, a gaze direction, and a gesture.

10. The method of claim 7, further comprising determining one or more previous states of the proximal vehicle based on a wireless communication, wherein predicting future movements of the proximal vehicle comprises predicting based on the one or more previous states of the proximal vehicle.

11. The method of claim 10, wherein the wireless communication comprises one or more of a vehicle-to-vehicle (V2V) communication and a vehicle-to-infrastructure (V2X) communication.

12. The method of claim 7, further comprising detecting one or more vehicle movements of the proximal vehicle, wherein predicting future movements of the proximal vehicle comprises predicting based on the one or more vehicle movements of the proximal vehicle.

13. The method of claim 7, further comprising accessing or processing a model or database correlating the state of the turn signal indicator and the body language of the driver with the predicted future movement.

14. The method of claim 13, wherein the model or database comprises machine learning values or correlations based on motion of one or more vehicles, driver body language, and turn signal information during previous intersection driving scenarios.

15. Computer readable non-transitory storage media storing instructions that, when executed by one or more processors, cause the processors to:

determine that a parent vehicle is near an intersection;

capture a plurality of images of a proximal vehicle;

identify a sub-portion in each of the plurality of the images containing a turn signal indicator on the proximal vehicle;

process image data in the sub-portion of the plurality of images to determine the state of the turn signal indicator;

predict future movement of the proximal vehicle through the intersection based on a state of the turn signal indicator;

process, using the one or more processors, image data in the sub-portion of the image containing a driver of the proximal vehicle to determine a body language of the driver;

predict, using the one or more processors, future movement of the proximal vehicle through the intersection based on the state of the turn signal indicator and the body language of the driver;

determine, using the one or more processors, a time for a parent vehicle to proceed through the intersection based on a predicted future movement of the proximal vehicle; and cause, using one or more processors or actuators, the parent vehicle to perform a driving maneuver based on a determined time to proceed through the intersection.

16. The computer readable storage media of claim 15, wherein the instructions further cause the processor to:

determine one or more previous states of the proximal vehicle based on wireless communications indicating the one or more previous states of the proximal vehicle; and predict future movements of the proximal vehicle based on the one or more previous states of the proximal vehicle.

17. The computer readable storage media of claim 15, wherein the instructions further cause the processor to:

identify a sub-portion of the image corresponding to a location of a driver;

detect a driver's body language by identifying one or more of a driver's head orientation, a gaze direction, and a gesture; and predict future movements of the proximal vehicle based on the driver's body language.

* * * * *